United States Patent Office
3,480,594
Patented Nov. 25, 1969

3,480,594
PHOSPHORUS CONTAINING URETHANE FOAMS
Glenn R. Price, San German, Puerto Rico, assignor to Stauffer Chemical Company, New York, N.Y., a corporation of Delaware
No Drawing. Original application Apr. 15, 1966, Ser. No. 542,717. Divided and this application Dec. 5, 1967, Ser. No. 708,460
Int. Cl. C08g 22/16, 22/44
U.S. Cl. 260—2.5    3 Claims

ABSTRACT OF THE DISCLOSURE

Phosphorus containing flame resistant polymers. The polymers are prepared by reacting an organic polyisocyanate and a hydroxy terminated phosphorus compound of the formula:

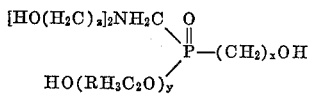

wherein R is selected from the group consisting of hydrogen, halogen, alkyl, and haloalkyl, said alkyl and haloalkyl having 1 or 2 carbon atoms, and $x$, $y$, and $z$ are integers of from 1 to 10.

---

This application is a division of application No. 542,-717, filed Apr. 15, 1966.

This invention relates to certain novel organophosphorus compounds and to polymers which may be produced therefrom, more particularly to a group of halo-substituted and unsubstituted hydroxypolyalkoxy aminomethylphosphinates which when reacted with organic polyisocyanates form polymeric compositions which are highly flame resistant.

The preparation of polyurethanes comprises reacting one or more polyols (i.e. compounds containing a reactive hydrogen) with an excess of organic polyisocyanates, usually toluene diisocyanate. To produce an expanded or foamed product, blowing agent is incorporated into the reaction mixture which causes the expansion of the polymer. These foamed products, which have many applications such as insulators and fillers, are unfortunately often highly flammable and thus unfit for many applications. Various additives have been mixed with the foams to render them flame-resistant, but they often leach out, thus restoring the foam to its original untreated condition.

I have now discovered a novel group of flame-resistant organophosphorus compounds which may be incorporated in a polyurethane foam to provide a permanently bound flame retardant. It is accordingly the primary object of this invention to provide these novel phosphorus compounds, a process for their preparation, and flame-resistant foams containing said compounds. Other objects will be apparent from the detailed description which follows.

The novel phosphorus containing compounds which I have discovered may be represented by the formula:

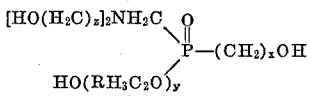

wherein R is selected from the group consisting of hydrogen, halogen, alkyl, and haloalkyl, said alkyl and haloalkyl having 1 or 2 carbon atoms, and $x$, $y$ and $z$ are integers of from 1 to 10.

The preparation of these new compounds may be illustrated by the following general reactions:

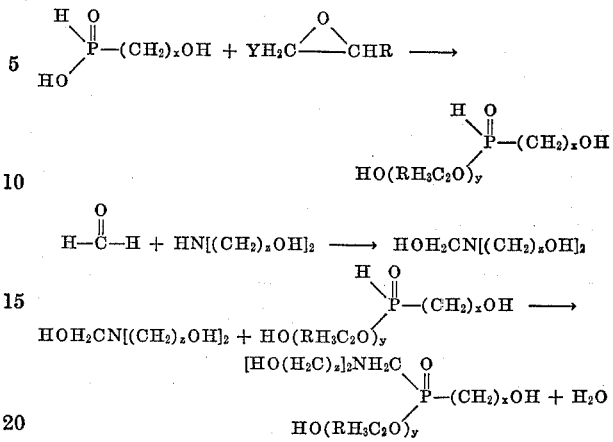

wherein R, $x$, $y$ and $z$ are as previously defined.

Briefly described, the reactions involve first condensing a hydroxyalkylphosphinic acid with a halo-substituted or unsubstituted 1,2-epoxyalkane, then reacting the resultant phosphinate intermediate with the reaction product of formaldehyde and a dialkanolamine to produce the novel organophosphinate.

Examples of suitable 1,2-epoxyalkanes include ethylene oxide, 1,2-epoxypropane, epichlorohydrin (1 chloro-2,3-epoxypropane) 1,2-epoxybutane, 1,2-epoxyoctane, 1,2-epoxydecane, etc. Suitable amines would include 2,2′-iminodiethanol, 2,2′-imino-2-dipropanol, 6,6′-imino-1-dihexanol, etc.

A working temperature range for the above reactions is from 0° to 100° C., preferably 25° to 70° C., but temperature is not a critical part of the invention. To ensure completion of the reaction, it is desirable, after addition of the reactants, to heat the reaction mixture for approximately one hour, preferably at a temperature from about 50° C. to about 70° C.

An important feature of the invention is that the high hydroxyl content of the novel aminophosphinates makes it possible to produce high molecular weight polyurethanes. Moreover, the novel compounds by serving as polymer chain extenders will not migrate or leach out of the foam.

The novel compounds may be used as the sole polyol or mixed with other polyols in the preparation of the polyurethane.

The following examples will serve to illustrate the invention but should not be construed as limiting examples for various modifications and variations within the true scope thereof will be apparent to one skilled in this art.

EXAMPLE 1

Preparation of hydroxypolychloropropoxy hydroxymethyl-N,N-diethanolaminomethylphosphinate To a one liter, three-necked reaction flask fitted with a thermometer, stirrer and input tube and containing 51.5 grams (0.5 mole) of diethanolamine was added a 40% aqueous solution of formaldehyde (0.5 mole of formaldehyde) while maintaining the temperature of the reaction mixture below 50° C. To this mixture was added 48.0 grams 0.5 mole) of hydroxymethylphosphinic acid treated with an excess of epichlorohydrin while maintaining the temperature of the reaction mixture below 70° C. After the addition was complete and the reaction was no longer exothermic, the reaction mixture was maintained at a temperature of 70° C. for one hour before concentrating at 70° C. and 1 mm. of mercury. The pure compound was found to have a phosphorous content of 9.7% and a hydroxyl equivalent weight of 110.

To test the flame-retardant properties of the compound of Example 1, said compound was incorporated into a rigid self-extinguishing foam by the following procedure.

EXAMPLE 2

The following materials were mixed together at room temperature:

| | G. |
|---|---|
| Hydroxypolychloropropoxy hydroxymethyl N,N-diethanolaminomethylphosphinate | 21.1 |
| Methylglucoside-based polyol (hydroxyl equivalent weight of 128) | 58.3 |
| N,N-dimethylethanolamine | 0.8 |
| Dibutyl tin dilaurate | 0.4 |
| Silicone surfactant | 0.7 |
| Trichlorofluoromethane | 26.0 |

This mixture was added to 92.5 g. polymethyl polyphenyl isocyanate (PAPI) and the resulting mixture was stirred rapidly. After about 20 seconds the mixture turned from a dark to a cream color and was quickly poured into a large container where a rapid expansion occurred. The foam hardened in about 1½ minutes and was found to be self-extinguishing when ignited and tested by ASTM test No. 1692–59T described hereinafter.

EXAMPLE 3

Preparation of hydroxypolyethoxy hydroxymethyl N,N-diethanolaminomethylphosphinate To a one liter, three-necked reaction flask fitted with a thermometer, stirrer and input tube and containing 144.0 g. (1.5 moles) of hydroxy methylphosphinic acid was added an excess of ethylene oxide. After the addition was complete, the mixture was maintained at a temperature of 90° C. for 1 hour while further introducing an excess of ethylene oxide to insure completion of the reaction. To this mixture was added a diethanolamine formaldehyde reaction product prepared by adding 45 g. (1.5 moles) of formaldehyde to 158 g. (1.5 moles) of diethanolamine while maintaining the temperature at or below 50° C. until the addition was complete, and thereafter maintaining the temperature at 50° C. for an additional hour. The temperature of the reaction mixture during the diethanolamine formaldehyde reaction product addition was maintained at or below 70° C. and after the addition was complete, the reaction mixture was maintained at 70° C. for 1 hour before being concentrated at 70° C. and 1 mm. of mercury to yield 502 g. of hydroxypolyethoxy hydroxymethyl - N,N - diethanolaminomethylphosphinate having a phosphorous content of 9.6% and a hydroxyl equivalent weight of 130.

The compound of Example 3 was reacted with a polyol to form a flame-resistant polyurethane foam according to the following procedure:

EXAMPLE 4

The following materials were mixed together at room temperature:

| | G. |
|---|---|
| Hydroxypolyethoxy hydroxymethyl-N,N-diethanolaminomethylphosphinate | 21.8 |
| Methyl glucoside-based polyol (hydroxyl equivalent weight of 128) | 62.8 |
| N,N-dimethylethanolamine | 1.2 |
| Dibutyl tin dilaurate | 0.4 |
| Silicone surfactant | 0.7 |
| Trichlorofluoromethane | 26.0 |

This mixture was added to 97.4 g. polymethyl·polyphenyl isocyanate and the resulting mixture was stirred rapidly. After about 30 seconds the mixture turned from a dark to a cream color and was quickly poured into a large container where a rapid expansion occurred. The foam hardened in about 2½ minutes and was found to be self-extinguishing when ignited and tested by ASTM test No. 1692–59T, described hereinafter.

The following compounds are prepared in accordance with the general procedure of Examples 1 and 3 and incorporated into a polyurethane foam by the general procedure of Examples 2 and 4.

EXAMPLE 5

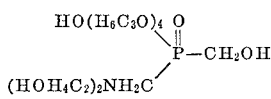

EXAMPLE 6

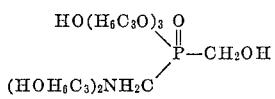

EXAMPLE 7

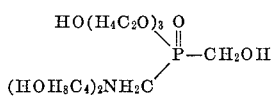

EXAMPLE 8

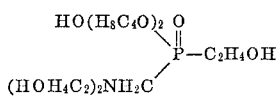

The test the relative flammability of the polyurethane foams of the preceding Examples 2 and 4, several 2″ x 6″ x ½″ test specimens were evaluated. These tests were carried out according to standard methods (ASTM Designation D 1692–59T issued 1959). For comparison purposes a polyurethane foam was made wherein no flame retardant such as the materials herein described was included. Polyurethane foams which were made containing the novel phosphinous compounds herein described were found to be self-extinguishing and fire-resistant as opposed to the control foams which burned freely.

In performing the foregoing experiments, ordinary commercial grade materials have been used with the exception of our new compounds. In formulating the urethane foams, we have limited the examples to the use of definitely identified polyols sulfactants and foaming agents since it is often difficult to ascertain the exact composition of these commercial compositions.

The exact proportions and reactants necessary to produce the flame-resistant copolymers are not critical. Stoichiometric quantities can be readily calculated from the hydroxyl number of the polyol (or the amount of active hydrogen in the case of amino or carboxy groups) and the number of —NCO groups in the isocyanate. Generally speaking, however, an excess of isocyanate of 5–15% of the stoichiometric amount is used. For the purpose of flame-proofing the final copolymer in accordance with the present invention, it is necessary to add enough of the novel phosphinate to supply at least about 1% P in the final copolymer with an upper limit of about 6%. Preferably 1½% to 2% is used.

Having thus described the invention, I claim:

1. A flame-resistant foam comprising the reaction product of an organic polyisocyanate and a hydroxy terminated phosphorus compound of the formula:

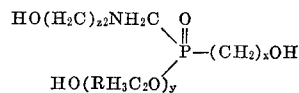

wherein R is selected from the group consisting of hydrogen, halogen, alkyl, and haloalkyl, said alkyl and haloalkyl having 1 or 2 carbon atoms, and $x$, $y$ and $z$ are integers of from 1 to 10, wherein said novel compound is reacted in an amount sufficient to impart flame resistance and wherein the reaction is carried out in the presence of a foaming agent.

2. The flame-resistant foam of claim 1 comprising the reaction product of an organic polyisocyanate and an amount of hydroxypolychloropropoxy hydroxymethyl-N,N-diethanolaminomethylphosphinate sufficient to provide at least about 1½ to 2 phosphorus in the final polymer.

3. The flame-resistant foam of claim 1 comprising the reaction product of an organic polyisocyanate and an amount of hydroxypolyethoxy hydroxymethyl-N,N-diethanolaminomethylphosphinate sufficient to provide at least about 1½ to 2 phosphorus in the final polymer.

References Cited

UNITED STATES PATENTS

| | | | |
|---|---|---|---|
| 3,134,742 | 5/1964 | Wismer et al. | 260—2.5 |
| 3,297,796 | 1/1967 | Smith et al. | 260—928 |

OTHER REFERENCES

Derwent Belgian Patents Report, No. 74, pp. 1:5—1:6.

DONALD E. CZAJA, Primary Examiner

M. J. WELSH, Assistant Examiner

U.S. Cl. X.R.

260—77.5, 945